United States Patent [19]

Rouse

[11] 4,069,451
[45] Jan. 17, 1978

[54] BICYCLE GENERATOR CIRCUIT

[76] Inventor: Paul S. Rouse, 103 N. Santa Anita Ave., Arcadia, Calif. 91006

[21] Appl. No.: 673,909

[22] Filed: Apr. 5, 1976

[51] Int. Cl.² .............................................. H02J 7/14
[52] U.S. Cl. ....................................... 322/1; 362/193
[58] Field of Search ................... 320/2, 59, 71; 322/1, 322/28, 89–91; 310/75 C; 240/7.6; 315/77–79

[56] References Cited

U.S. PATENT DOCUMENTS

| | | | |
|---|---|---|---|
| 3,530,366 | 9/1970 | Schwarm | 322/90 X |
| 3,636,434 | 1/1972 | Beuk et al. | 322/94 X |
| 3,753,000 | 8/1973 | Newman | 315/78 X |
| 3,792,307 | 2/1974 | Baker | 240/7.6 X |

*Primary Examiner*—Robert J. Hickey
*Attorney, Agent, or Firm*—Marshall A. Lerner

[57] ABSTRACT

A bicycle generator circuit is disclosed for providing a regulated output voltage to a bicycle mounted appliance. The circuit includes a zener diode which is coupled through input filtering and limiting resistors to the output of the bicycle generator to reduce the high peaks of pulsating voltage from the ouptut of the bicycle generator. A rectifier is coupled through a filtering and limiting resistor to the zener diode to rectify the pulsating voltage to provide an effective DC voltage and prevent reverse leakage from the battery actuated appliance when the generator is not in a charging mode. A capacitor is coupled to the output of the rectifier and across the output terminals of the circuit to eliminate noise and provide a smooth DC output voltage which is coupled to the appliance to provide direct energization and/or a charging voltage for a battery actuated appliance.

4 Claims, 2 Drawing Figures

BICYCLE GENERATOR CIRCUIT

BACKGROUND OF THE INVENTION

The present invention relates to a bicycle generator circuit and more particularly to an circuit coupled to a standard bicycle generator for providing a direct energizing voltage to a bicycle mounted appliance and/or a charging voltage for a battery actuated appliance.

Various prior art bicycle generators have been used to provide a voltage to an appliance such as a transistor radio mounted on the handlebars of the bicycle. Such prior art generators typically provide a 6 volt or 12 volt output which is coupled to the input of the transistor radio or other appliance such as a small tape deck adapted to be mounted on the handlebars of the bicycle. Such devices have not proven to be satisfactory since they do not provide adequate voltage regulation. For example, a transistor radio which operates on a 4.5 volt DC power supply would suffer damage if it were energized by such a 6 or 12 volt bicycle generator. Similarly a standard 9 volt input transistorized radio would be severely damaged if it were coupled to the output of a 12 volt bicycle generator.

SUMMARY OF THE INVENTION

The present invention provides a bicycle generator circuit which provides a regulated output DC voltage for a bicycle mounted appliance. To attain this, the present invention provides an circuit having a zener diode circuit means which is coupled to the output of a standard bicycle generator. The zener diode circuit includes filtering and limiting resistors and is effective to reduce the high peaks of the pulsating voltage generated by the bicycle generator.

The output of the zener diode circuit is coupled to a rectifier through one of the filtering and limiting resistors to rectify the pulsating voltage to provide an effective DC voltage. The rectifier circuit also prevents leakage from the battery of the appliance when the circuit is not in the charging mode. A capacitor is coupled to the output of the rectifier and across the output terminals of the circuit to provide a smooth DC output voltage which is coupled to the bicycle mounted appliance.

Thus, the zener diode of the present invention prevents excess voltage from being applied to the appliance. The diode rectifies the pulsating voltage applied to the appliance to provide an effective DC voltage and prevent reverse leakage from a battery actuated appliance. The capacitor coupled across the output provides filtering as well as smoothing of the effective output DC voltage.

The bicycle generator circuit of the present invention may thereby be used to provide a relatively constant voltage input to a bicycle mounted transistorized appliance such as a radio or tape deck having an input voltage of 4.5 volts using a bicycle generator which generates a 6 or 12 volt output. It may also be used to provide a 9 volt input to a bicycle mounted appliance using a standard bicycle generator which generates a 12 volt output.

Although the present invention is best suited to a battery actuated appliance, it may be used without batteries provided the bicycle is continuously in motion. When used in conjunction with a battery actuated appliance, the present invention substantially extends the useful life of the battery. For example, tests on a standard 9 volt battery actuated bicycle mounted radio using the present invention provided over 1000 hours of usage of the batteries using the circuit of the present invention.

Accordingly, an object of the present invention is to provide circuit means for a bicycle generator circuit for providing battery charging for an appliance.

Another object is to provide circuit means coupled to a standard bicycle generator for providing a constant filter voltage.

Yet another object is to provide means for smoothing and filtering a bicycle generator voltage for providing a constant DC output source.

Other objects, advantages and novel features of the present invention will become apparent from the following detailed description of the invention when considered in conjunction witn the accompanying drawings.

Figure 1:
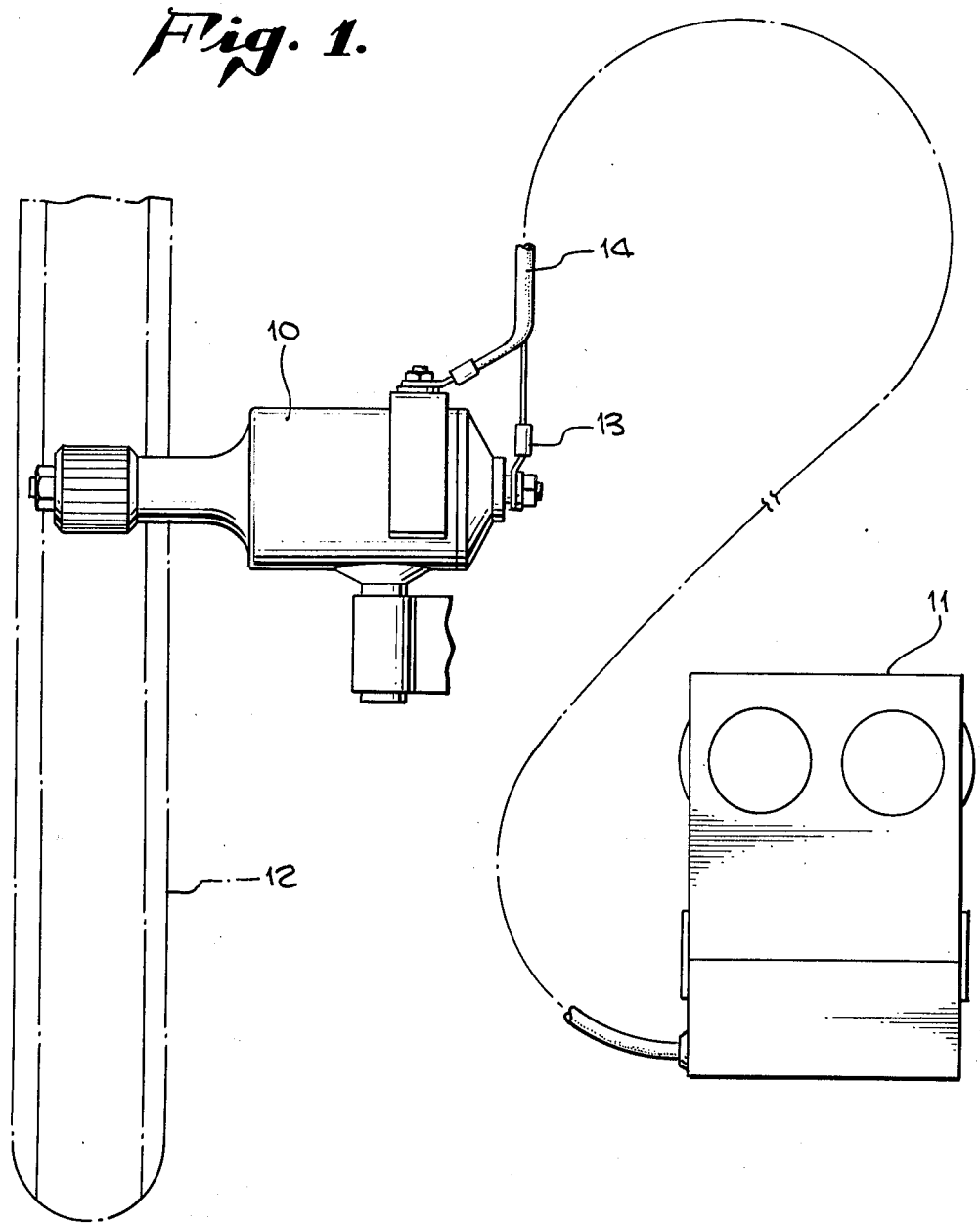
FIG. 1 is a diagram of the bicycle generator and an appliance to which it is coupled through the circuit of the present invention.
Figure 2:
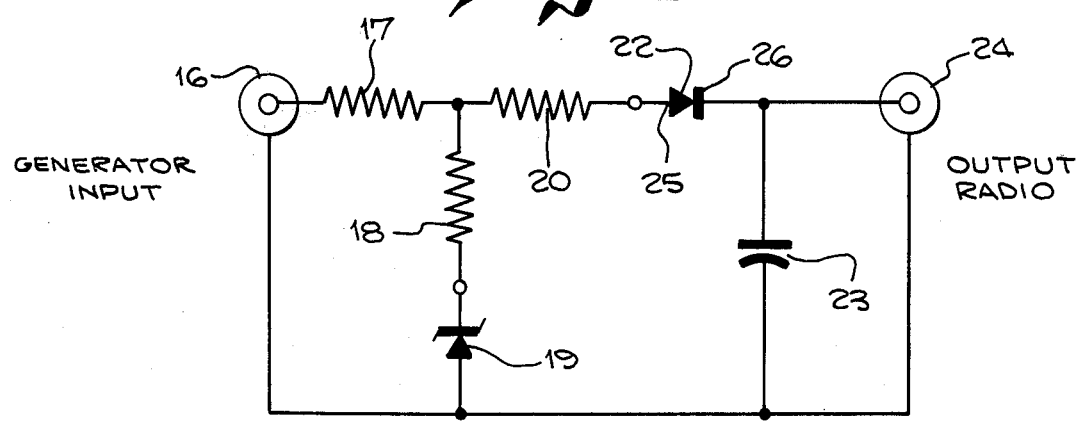
FIG. 2 is a schematic diagram of the circuit of the present invention.

DESCRIPTION OF THE PREFERRED EMBODIMENT:

Referring to FIG. 1, there is shown a bicycle generator 10 coupled through the circuit shown in FIG. 2 to a bicycle mounted appliance 11 to provide a regulated charging voltage to the battery of the appliance or, alternatively, to provide a regulated voltage directly to the appliance. The generator 10 converts rotational energy from a bicycle tire 12 to electrical energy which is transmitted from an output terminal 13 through a suitable cable 14 to the circuit to provide a well regulated filtered DC voltage to the bicycle mounted appliance.

The cable 14 transmits an input voltage from the generator 10 to input terminal 16 of the circuit. Typical bicycle generators provide a 6 or 12 volt output voltage and this output voltage is transmitted through resistors 17 and 18 to zener diode circuit means which includes zener diode 19. Resistors 17 and 18, as well as a resistor 20 provide current limiting as well as filtering of the voltage transmitted from the bicycle generator 10. The zener diode 19 breaks down under high voltage conditions to thereby eliminate high voltage signals and prevent overchanging of the batteries if the appliance 11 is battery operated. If the cable 14 is directly coupled to the input of the appliance, the zener diode 19 prevents an excessively high voltage from being applied to the input terminals of the appliance 11.

Rectifier circuit means including a rectifier 22 having an anode terminal 25 coupled to the resistor 20 is provided to rectify the pulsating DC voltage and prevent reverse leakage from the battery of the appliance 11 when the circuit is not in the charging mode.

Capacitor circuit means including a capacitor 23 is coupled to a cathode terminal 26 of the rectifier 22 to eliminate noise and provide a smooth regulated DC output voltage which is coupled to an output terminal 24 of the circuit as shown. In the preferred embodiment, the capacitance of the capacitor 23 is in the order of a 1000 microfarads. In addition, the resistance of the resistors 17 and 20 is in the order of 10 ohms and the resistance of the resistor 18 is in the order of 100 ohms.

The device thereby permits the use of a standard wheel driven bicycle generator to provide a voltage to operate a battery powered appliance 11 such as a transistor radio which may be an am/fm or am radio, or a transistorized tape recorder. The output 24 of the circuit shown in FIG. 2 may be coupled to recharge the batteries, or, alternatively to provide electrical energy directly to the appliance 11 by bypassing the batteries. Under such circumstances, when the bicycle is not in motion and the generator is not operating, the appliance would automatically revert to power from its batteries.

Thus, the present invention provides a well regulated smooth DC voltage to operate a bicycle mounted appliance.

Obviously many modifications and variations of the present invention are possible in light of the above teachings. It is therefore to be understood that within the scope of the appended claims, the invention can be practiced otherwise than as specifically described.

I claim:

1. A regulator circuit for regulating the output voltage from a bicycle generator comprising:
   a bicycle generator having an output circuit;
   a resistive circuit including at least one resistor coupled in series with the output terminal of said bicycle generator and at least a second resistor, said resistive circuit being operative to limit the output voltage from said bicycle generator;
   a zener diode having an anode and cathode terminal with said cathode terminal being coupled to said second resistor of said resistive circuit to reduce the output voltage of said bicycle generator, said zener diode and said second resistor being coupled across said input terminal and being operative to reduce high peaks of the output voltage from the generator;
   a rectifier having an anode and cathode with said anode coupled through said resistive circuit to said cathode of said zener diode, said rectifier being operative to rectify the output voltage from the generator; and
   capacitor circuit means coupled to the output of said rectifier circuit means for smoothing and filtering of said output voltage to thereby provide a regulated smooth output voltage.

2. The circuit as described in claim 1 wherein said circuit is coupled to the batteries in a battery operated appliance and wherein said rectifier circuit means is coupled to said batteries to prevent reverse leakage from said batteries of said battery operated appliance.

3. The circuit as described in claim 2 and wherein said cathode of said rectifier circuit means is coupled to said batteries of said battery operated appliance, said cathode of said rectifier circuit means being further coupled to said capacitor circuit means.

4. A regulator circuit for regulating an input voltage obtained from the output of a bicycle generator to provide a regulated output voltage to an appliance comprising;
   a bicycle generator having an output terminal;
   an input terminal coupled to the output terminal of said bicycle generator;
   a resistive circuit including at least one resistor coupled in series with the output terminal of said bicycle generator and at least a second resistor, said resistive circuit being operative to limit the output voltage from said bicycle generator;
   a zener diode having an anode and cathode terminal with said cathode terminal coupled to said second resistor of said resistive circuit to reduce the output voltage of said bicycle generator, said zener diode and said second resistor being coupled across said input terminal and being operative to reduce high peaks of the output voltage from the generator;
   a blocking diode rectifier having an anode and cathode with said anode coupled through said resistive circuit to said cathode of said zener diode, said blocking diode rectifier being operative to rectify the output voltage from the generator;
   a capacitor having one terminal coupled directly to the cathode of said blocking diode rectifier, said capacitor being operative to provide smoothing and filtering of the voltage transmitted through said blocking diode rectifier; and
   an output terminal coupled to said cathode terminal of said blocking diode rectifier and to said capacitor for providing a regulated smooth output voltage to an appliance.

* * * * *